United States Patent
Bradish et al.

(10) Patent No.: US 11,843,994 B2
(45) Date of Patent: Dec. 12, 2023

(54) ASSET TRACKING SYSTEM USING SIGNAL PROFILES

(71) Applicant: PwC Product Sales LLC, New York, NY (US)

(72) Inventors: Stillman Bradish, Washington, DC (US); Wei Wang, Irvine, CA (US)

(73) Assignee: PwC Product Sales LLC, New York, NY (US)

(*) Notice: Subject to any disclaimer, the term of this patent is extended or adjusted under 35 U.S.C. 154(b) by 0 days.

(21) Appl. No.: 17/679,897

(22) Filed: Feb. 24, 2022

(65) Prior Publication Data

US 2023/0269558 A1    Aug. 24, 2023

(51) Int. Cl.
*H04W 4/029* (2018.01)
*G01S 5/02* (2010.01)
*H04W 4/80* (2018.01)

(52) U.S. Cl.
CPC ......... *H04W 4/029* (2018.02); *G01S 5/02521* (2020.05); *H04W 4/80* (2018.02)

(58) Field of Classification Search
CPC ...... H04W 4/029; H04W 4/80; G01S 5/02521
See application file for complete search history.

(56) References Cited

U.S. PATENT DOCUMENTS

| | | | |
|---|---|---|---|
| 8,903,416 B1* | 12/2014 | Perkins | H04L 67/12 340/572.1 |
| 10,810,388 B2* | 10/2020 | Kawaguchi | G06K 7/10108 |
| 10,834,548 B2 | 11/2020 | Mesirow et al. | |
| 2016/0180045 A1* | 6/2016 | Syed | G16H 10/60 705/2 |
| 2016/0330041 A1 | 11/2016 | Wang et al. | |
| 2017/0308727 A1 | 10/2017 | Lombardi et al. | |
| 2020/0128370 A1* | 4/2020 | Mesirow | G01S 5/16 |

FOREIGN PATENT DOCUMENTS

WO    2020/081970 A2    4/2020

OTHER PUBLICATIONS

Bisio et al. "Asset Tracking Architecture with Bluetooth Low Energy Tags and ad hoc Smartphone Applications," European Conference on Networks and Communications (EuCNC), Jun. 29, 2015, Paris, France; pp. 460-464.
International Search Report and Written Opinion dated Oct. 21, 2022, directed to International Application No. PCT/US2022/070813; 13 pages.

* cited by examiner

*Primary Examiner* — John A Tweel, Jr.
(74) *Attorney, Agent, or Firm* — Morrison & Foerster LLP

(57) ABSTRACT

Provided are asset tracking systems for determining a location of an asset, comprising a mobile device comprising one or more detection antennas and a transmitter, and a device associated with an asset and emitting Bluetooth low energy signals, wherein the system is configured to: detect a plurality of electromagnetic signals of the environment and one or more Bluetooth low energy signals from the one or more Bluetooth low energy devices; generate a signal profile based on the plurality of electromagnetic signals; determine, based on a comparison of the signal profile to data of signal profiles at a plurality of locations in the environment, a mobile-device location in the environment; and determine, based on the mobile-device location and based on the one or more Bluetooth low energy signals, one or more asset locations in the environment.

32 Claims, 5 Drawing Sheets

ASSET TRACKING SYSTEM USING SIGNAL PROFILES

FIELD

The present disclosure relates to asset tracking systems and, more particularly, to asset tracking systems that use signal profiles to determine a location of a mobile device and to infer locations of assets in proximity to the mobile device.

BACKGROUND

Many facilities such as hospitals, hotels, senior care facilities, laboratories, schools, warehouses, office buildings, and construction sites rely on the use of various mobile equipment, supplies, and materials. These mobile equipment, supplies, and/or materials may be transferred from one room to another, from one floor to another, and/or from one wing of the building to another. However, the mobile equipment, supplies, and/or materials are only useful if their location within the environment may be readily and accurately determined. Tracking assets quickly and accurately can be particularly important in medical settings, where quickly locating assets can be critical to providing patient care. For example, if a first physician at a hospital uses a portable medical device in a patient room and leaves it in that room when he is finished, the medical device can only thereafter be used by a second physician if that physician can identify the location of the medical device.

SUMMARY

As described above, tracking portable assets throughout a physical environment is important in a large number of settings. However, known systems for tracking portable devices and assets require manually scanning (e.g., barcodes), require deployment of costly equipment (e.g., radio frequency identification (RFID) tags and RFID readers) and/or require large amounts of energy (e.g., causing short battery lives). The shortcomings of these systems further include that they require hardware that is prohibitively expensive to be used with hundreds, thousands, or tens of thousands of assets in a single deployment. Additionally, these systems require frequent changing or charging of batteries for mobile transmitters and/or receivers, which renders large-scale deployments impracticable. Thus, there is a need for asset tracking systems that are capable of determining asset locations for thousands or tens of thousands of assets in a single environment, where the system does not require costly or power-intensive transmitters and/or receivers for every tracked asset. Additionally, there is a need for asset tracking systems that can be easily and quickly deployed in environments that already have certain location-determination infrastructure in place.

Provided herein are asset tracking systems that utilize existing location-determination systems. The asset tracking systems provided can be relatively inexpensive to implement and maintain, and can also provide longer lasting operation (e.g., have a longer battery life) than known systems.

Accordingly, provided herein are asset tracking systems and methods, which may be integrated into existing location-determination systems. For example, location-determination systems may be able to locate a mobile device within an environment (e.g., facility). The mobile device may, for example, be provided as a smart phone or as a dedicated tracking device (e.g., a wearable device). In some embodiments, the user carrying a mobile device throughout the environment may be a surgeon or operating room attendant in the case of a hospital, or a housekeeping worker in the case of a hotel. In order to determine the location of the mobile device within the environment, the mobile device can detect signals emitted from resident devices within its vicinity. The resident devices can include, for example, any of various devices that emit electromagnetic signals such as Wi-Fi access points, Bluetooth devices, portable electronic devices such as phones and tablets, personal computers, and/or any number of IoT devices such as network-enabled appliances and infrastructure equipment. The mobile device may then send information of the detected signals from the resident devices to a remote system, such that the information can be processed to determine, based on the signal information, a location of the mobile device.

In addition to collecting signals from resident devices and using said signals to determine a location of the mobile device, the mobile device may also collect signals from devices associated with assets to be tracked, and the system may use those collected signals to determine the location of the tracked assets. The systems provided herein can include a plurality of asset-tracking devices that emit Bluetooth low energy (BLE) signals that are collected by the mobile devices of the system. In some embodiments, the BLE-emitting devices may include BLE tags affixed to items or assets which need to be tracked. BLE tags are relatively inexpensive, such that an asset tracking system utilizing BLE tags may be implemented in a cost-effective manner. Further, the BLE tags used in asset tracking systems provided may also include a relatively long battery life. In some embodiments, the BLE-emitting devices may include a computer or device of an asset configured to emulate a BLE tag. By configuring the mobile devices to collect BLE tag signals and to upload the BLE signal information using the same communication channels by which the mobile device uploads signal data (e.g., signal profiles) used to determine its own location, the configurations disclosed herein allows for efficient and low-cost implementation in systems that are already configured for location determination of mobile devices.

Items/assets to be tracked can include equipment or supplies (e.g., any mobile item that may be moved from one region of the environment to another region of the environment). In the case of a hospital, items/assets for tracking may include medical equipment, medical devices, or medical supplies (e.g., medication, blood bags). When a user initiates or activates the mobile device as described above, it detects ambient electromagnetic signals from one or more resident devices within the environment. It also detects signals emitted from one or more BLE tags within the vicinity of the mobile device. Thus, when the mobile device sends information about the detected signals to a remote server, said information includes information about the ambient signals detected from resident devices as well as information about signals emitted from specific BLE-emitting devices (e.g., tags). Accordingly, the system can, based on the information provided to the remote server by the mobile device, determine (a) where the mobile device is located within the environment, based on the signal information pertaining to signals detected from resident and (b) the location of one or more items/assets within the environment, based on the determined location of the mobile device and based on the signals information pertaining to signals detected from one or more BLE emitting devices.

In some embodiments, an asset tracking system for determining a location of an asset is provided, the system comprising: a mobile device comprising one or more detection antennas configured to detect electromagnetic signals in an environment and a transmitter configured to transmit signals; and a device emitting Bluetooth low energy signals, wherein the devices emitting Bluetooth low energy signals is associated with an asset within the environment; wherein the system is configured to: detect, at the one or more detection antennas of the mobile device, a plurality of electromagnetic signals of the environment and one or more Bluetooth low energy signals from the device emitting Bluetooth low energy signals; generate, at the mobile device, a signal profile based on the plurality of electromagnetic signals; determine, based on a comparison of the signal profile to data of signal profiles at a plurality of locations in the environment, a mobile-device location in the environment; and determine, by one or more processors, based on the mobile-device location and based on the one or more Bluetooth low energy signals, an asset location in the environment.

In some embodiments of the asset tracking system, the system is configured to transmit, at the transmitter of the mobile device, the signal profile to the one or more processors.

In some embodiments of the asset tracking system, transmitting the signal profile to the one or more processors comprises transmitting the signal profile to one or more base stations.

In some embodiments of the asset tracking system, transmitting the signal profile to the one or more processors comprises transmitting the signal profile from the one or more base stations to a server.

In some embodiments of the asset tracking system, the signal profile comprises information about a subset of the plurality of electromagnetic signals.

In some embodiments of the asset tracking system, the plurality of electromagnetic signals of the environment comprises signals emitted by one or more of: Wi-Fi access points, Bluetooth devices, network-enabled appliances, network-enabled infrastructure devices, and IoT devices.

In some embodiments of the asset tracking system, generating the signal profile based on the plurality of electromagnetic signals comprises comparing the plurality of electromagnetic signals to a predefined list of electromagnetic signals to select a subset of the plurality of electromagnetic signals based on the predefined list.

In some embodiments of the asset tracking system, the data of signal profiles at a plurality of locations in the environment comprises data captured by a detection device prior to the detection of the plurality of electromagnetic signals by the mobile device.

In some embodiments of the asset tracking system, the mobile device is configured to detect an input comprising an instruction to determine the location of the mobile device, and the detection of the plurality of electromagnetic signals in the environment is performed in response to detecting the input.

In some embodiments of the asset tracking system, the system is further configured to generate and display an alert regarding the determined location of the mobile device.

In some embodiments of the asset tracking system, the environment comprises a hospital, a hotel, a residential building, a commercial building, a senior living facility, or a school.

In some embodiments of the asset tracking system, the asset includes medical equipment or medical supplies.

In some embodiments of the asset tracking system, a Bluetooth low energy signal emitted by a Bluetooth low energy device of the one or more Bluetooth low energy devices includes battery life information of the Bluetooth low energy device.

In some embodiments of the asset tracking system, each Bluetooth low energy signal of the one or more Bluetooth low energy signals comprises identification information identifying at least one of a first Bluetooth low energy device or a first asset.

In some embodiments of the asset tracking system, the one or more devices emitting Bluetooth low energy signals comprises a Bluetooth low energy tag.

In some embodiments of the asset tracking system, the one or more devices emitting Bluetooth low energy signals comprises a device configured to emulate a Bluetooth low energy tag.

In some embodiments of the asset tracking system, the system is configured to transmit, at the transmitter of the mobile device, data regarding the one or more Bluetooth low energy signals to the one or more processors.

In some embodiments of the asset tracking system, the data regarding the one or more Bluetooth low energy signals, transmitted to the one or more processors, comprises identification information identifying the device emitting Bluetooth low energy signals.

In some embodiments of the asset tracking system, the data regarding the one or more Bluetooth low energy signals, transmitted to the one or more processors, comprises signal strength information indicating a signal strength associated with the one or more Bluetooth low energy signals emitted by the device emitting Bluetooth low energy signals and detected by the mobile device.

In some embodiments of the asset tracking system, the data regarding the one or more Bluetooth low energy signals, transmitted to the one or more processors, comprises battery information associated with the device emitting Bluetooth low energy signals.

In some embodiments of the asset tracking system, transmitting the data regarding the one or more Bluetooth low energy signals to the one or more processors comprises transmitting the data regarding the one or more Bluetooth low energy signals to one or more base stations.

In some embodiments of the asset tracking system, transmitting the data regarding the one or more Bluetooth low energy signals to the one or more processors comprises transmitting the data regarding the one or more Bluetooth low energy signals from the one or more base stations to a server.

In some embodiments of the asset tracking system, transmitting the data regarding the one or more Bluetooth low energy signals comprises transmitting identity information identifying the device emitting Bluetooth low energy signals and transmitting signal strength information regarding the one or more Bluetooth low energy signals.

In some embodiments of the asset tracking system, transmitting the data regarding the one or more Bluetooth low energy signals comprises transmitting identity information identifying the device emitting Bluetooth low energy signals and transmitting device status information regarding the device emitting Bluetooth low energy signals.

In some embodiments of the asset tracking system, the system is configured to: detect, by the mobile device, a plurality of Bluetooth low energy signals emitted by a plurality of different devices; and select, by the mobile device, a subset of the plurality of Bluetooth low energy signals, wherein the one or more Bluetooth low energy signals from the device are part of the selected subset.

In some embodiments of the asset tracking system, selecting the subset of the plurality of Bluetooth low energy signals comprises selecting signals based on device identity information included in the selected signals.

In some embodiments of the asset tracking system, selecting the subset of the plurality of Bluetooth low energy signals comprises selecting signals based on signal strength of the selected signals.

In some embodiments of the asset tracking system, selecting the subset of the plurality of Bluetooth low energy signals comprises iteratively updating the subset to include the signals having the highest signal-strength detected over a period of time.

In some embodiments of the asset tracking system, the one or more devices emitting Bluetooth low energy signals comprises a device configured to selectively operate in a first mode or a second mode, wherein when in the first mode, the device is configured to collect other Bluetooth low energy signals emitted by other devices in the system and to transmit data regarding the other Bluetooth low energy signals collected; and when in the second mode, the device is configured to emit Bluetooth low energy but to not collect other Bluetooth low energy signals nor transmit data regarding other Bluetooth low energy signals.

In some embodiments of the asset tracking system, the device configured to selectively operate in a first mode or a second mode is configured to switch from the first mode to the second mode in accordance with a determination that a set of trigger conditions is met.

In some embodiments of the asset tracking system, the device configured to selectively operate in a first mode or a second mode is configured to switch from the first mode to the second mode in accordance with receipt of a control signal.

In some embodiments, an asset tracking method for determining a location of an asset, the method performed by a system comprising: a mobile device comprising one or more detection antennas configured to detect electromagnetic signals in an environment and a transmitter configured to transmit signals; and a device emitting Bluetooth low energy signals, wherein the devices emitting Bluetooth low energy signals is associated with an asset within the environment; wherein the method comprises: detecting, at the one or more detection antennas of the mobile device, a plurality of electromagnetic signals of the environment and one or more Bluetooth low energy signals from the device emitting Bluetooth low energy signals; generating, at the mobile device, a signal profile based on the plurality of electromagnetic signals; determining, based on a comparison of the signal profile to data of signal profiles at a plurality of locations in the environment, a mobile-device location in the environment; and determining, by one or more processors, based the mobile-device location and based on the one or more Bluetooth low energy signals, an asset location in the environment.

In some embodiments, a non-transitory computer-readable storage medium for determining a location of an asset is provided, the storage medium storing instructions configured to be executed by a system comprising: a mobile device comprising one or more detection antennas configured to detect electromagnetic signals in an environment and a transmitter configured to transmit signals; and a device emitting Bluetooth low energy signals, wherein the devices emitting Bluetooth low energy signals is associated with an asset within the environment; wherein the instructions are configured to cause the system to: detect, at the one or more detection antennas of the mobile device, a plurality of electromagnetic signals of the environment and one or more Bluetooth low energy signals from the device emitting Bluetooth low energy signals; generate, at the mobile device, a signal profile based on the plurality of electromagnetic signals; determine, based on a comparison of the signal profile to data of signal profiles at a plurality of locations in the environment, a mobile-device location in the environment; and determine, by one or more processors, based the mobile-device location and based on the one or more Bluetooth low energy signals, an asset locations in the environment.

In some embodiments, any one or more of the features, characteristics, or elements discussed above with respect to any of the embodiments may be incorporated into any of the other embodiments mentioned above or described elsewhere herein.

Figure 1:
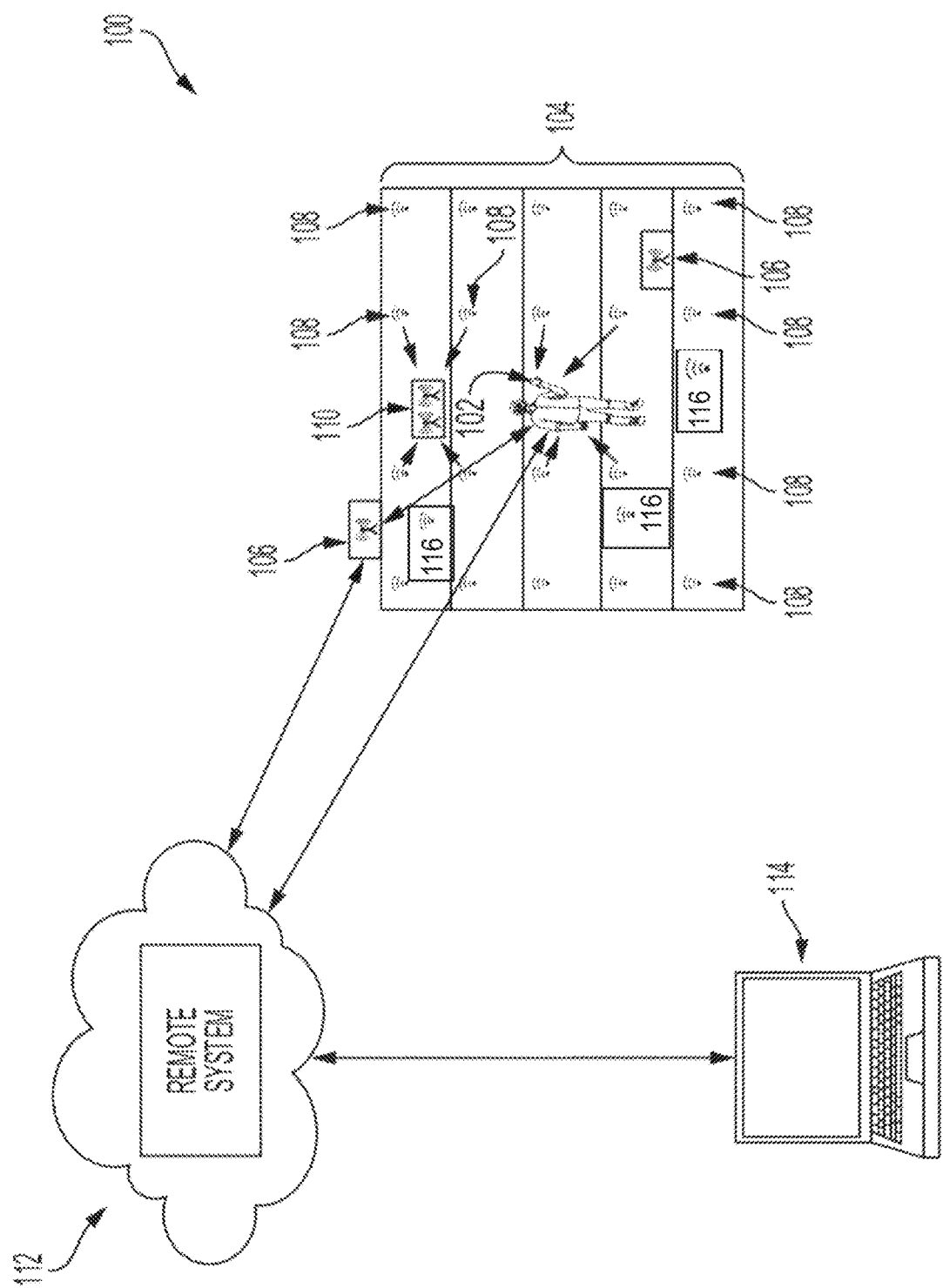
FIG. 1 shows a schematic representation of a system for asset tracking and location-determination, according to some embodiments.

These and other features of the present embodiments may be understood better by reading the following detailed description, taken together with the figures herein described. In the drawings, identical or nearly identical components illustrated in multiple figures may be represented by a like reference numeral. For purposes of clarity, not every component may be labeled in every drawing. Furthermore, as will be appreciated in light of this disclosure, the accompanying drawings are not intended to be drawn to scale or to limit the described embodiments to the specific configurations shown.

DETAILED DESCRIPTION

Described herein are asset tracking systems and methods. Specifically, these asset tracking systems and methods may be integrated into existing location-determination systems that are designed to identify the location of a user-operated mobile device within an environment such as a hotel, hospital, retirement home, commercial building, museum, or the like. Many such environments contain assets (e.g., equipment, supplies) that can be managed and/or monitored. The asset tracking systems and methods provided herein can monitor the location of such assets in order to determine asset location, track asset movement, and/or assess asset inventory. Further, by integrating the asset tracking system into an existing location-determination system, the asset tracking system can be low cost and easy to implement.

One example of an existing location-determination system, which may be improved by the addition of devices and functionality to provide an asset tracking system, is described in detail within U.S. Pat. No. 10,834,548, the entirety of which is incorporated herein. The location-determination systems described in U.S. Pat. No. 10,834, 548 include determining the location of a mobile device (configured to be carried or worn by a user) within a predefined environment such as a hotel, hospital, school, laboratory, or the like. The location of the mobile device is determined by detecting electromagnetic signals emitting from resident devices within the system. Information from the detected electromagnetic signals are compared to a signal map of the environment to determine a location of the mobile device.

FIG. 1 shows a schematic representation of a system 100 for asset tracking and location-determination, according to some embodiments. In the example of FIG. 1, system 100 may be configured to identify the location of a mobile device 102 and the presence of assets 116 in environment 104.

As shown in FIG. 1, system 100 comprises mobile device 102, which may be any mobile/portable electronic device configured to be locatable in environment 104 by system 100. In some embodiments, mobile device 102 may be configured to be worn by a person (e.g., an employee of a hotel, hospital, laboratory, senior living facility, etc.), or carried by such person.

In some embodiments, system 100 comprises a plurality of mobile devices 102. For example, the environment (e.g., hotel, hospital, laboratory) may have a plurality of employees, each of whom may carry a mobile device 102 on their person. In some embodiments, each of a plurality of mobile devices 102 are identifiable by system 100, such as by a unique device identifier or other metadata. In this way, the location of multiple persons may be tracked within the same environment. This disclosure will refer to characteristics of mobile device 102, but those characteristics may be shared by one or more additional devices that may be deployed in a multi-device environment.

In some embodiments, mobile device 102 may comprise one or more antennas configured to detect electromagnetic signals emitted by one or more devices (e.g., resident devices 108). The one or more antennas may also be configured to detect electromagnetic signals (e.g., Bluetooth low energy signals) from one or more Bluetooth low energy-emitting devices 116 in environment 104. Resident devices 108 may comprise any wireless device, such as one or more of any of the following electronic devices: Wi-Fi access points, Bluetooth devices, portable electronic devices such as phones and tablets, personal computers, and/or any number of IoT devices such as network-enabled appliances and infrastructure equipment. As shown in FIG. 1, resident devices 108 may be distributed at various locations throughout environment 104, and the electromagnetic signals emitted by resident devices 108 may be detected by the one or more antennas of mobile device 102. As mobile device 102 moves about different locations within environment 102, it may detect signals from different devices 108, and may detect those signals at different strengths; the identity and characteristics of those signals detected by mobile device 102 may be used, as discussed below, to determine a location of mobile device 102.

Mobile device 102 may also be configured to detect Bluetooth low energy (BLE) signals emitted from BLE-emitting devices 116. BLE-emitting devices 116 may include a BLE tag or a computer/device emulating a BLE tag. Each BLE-emitting device 116 may be affixed to an item/asset (in the case of a BLE tag) or integrated within an item/asset (in the case of a computer or device emulating a BLE tag) that may be moved within the environment. For example, a BLE-emitting device 116 may be affixed to a piece of equipment used in a hospital such that system 100 can track or identify the location of the equipment to which BLE-emitting device 116 is associated. In some embodiments, BLE-emitting device 116 is a BLE tag that may be affixed to equipment (e.g., cleaning cart, ventilator, ultrasound machine, endoscope, etc.), supplies (e.g., cleaning supplies, medication, blood bags, etc.), or any other type of asset. In some embodiments, BLE-emitting device 116 is a computer embedded or integrated within equipment (e.g., medical equipment) or supplies. For example, a medical device may comprise a computer than can be coded to emulate a BLE tag. In some embodiments, system 100 includes a plurality of BLE-emitting devices 116 for various equipment, supplies, etc. System 100 may be configured to "read" or "identify" the location of the plurality of BLE-emitting devices 116 while at the same time identifying the location of mobile device 102. This can allow location management (i.e., tracking) of the items/assets to which the BLE-emitting devices 116 are associated. For example, this can provide an effective tracking tool to manage the location of valuable hospital equipment, medical supplies, hotel cleaning supplies and equipment, and the like.

In some embodiments, BLE-emitting devices 116 do not read or detect any signals, but only broadcast signals. In some embodiments, BLE-emitting devices 116 broadcast pre-handshake broadcast signal. (If a handshake protocol were required, the battery life of the tag 116 would be drained much more quickly, and connectivity might also be limited). The broadcast signal may include information about the battery life of the BLE-emitting device 116 from which the signal is broadcast (e.g., the battery life may be encoded into the signal broadcast from a specific BLE-emitting device 116, such as a BLE tag).

As shown in FIG. 1, BLE-emitting devices 116 may be affixed to (or integrated within) various equipment and/or supplies throughout environment 104. The electromagnetic signals emitted by BLE-emitting devices 116 may be detected by the one or more antennas of mobile device 102. As mobile device 102 moves about different locations within environment 102, it may detect signals from different BLE-emitting devices 116, and it may detect those signals at different strengths. The identity and characteristics of those signals detected by mobile device 102 may be used, as discussed below, to determine which items/assets (e.g., equipment, supplies) are within the vicinity of mobile device 102.

For example, in response to one or more inputs, trigger conditions, and/or schedules, device 102 may begin receiving signals from one or more resident devices 108 and/or one or more BLE-emitting devices 116. One or more antennas of mobile device 102 may detect the signals transmitted by the one or more resident devices 108 and/or the one or more BLE-emitting devices 116, and identify both (1) where the mobile device 102 (and user wearing or carrying the device) is located within the environment 104, and (2) which trackable items/assets are located within the vicinity of mobile device 102 based on which BLE-emitting devices 116 are detected by mobile device 102. Thus, the information detected by mobile device 102 may be able to determine on which floor, wing, room, and/or region of environment 104 mobile device 102 is located, as well as which items/assets are located on said floor, wing, room, and/or region of environment 104 with mobile device 102 (i.e., items associated with a BLE-emitting device 116). This can allow facilities such as hospitals, hotels, etc., to manage equipment and supply inventory and location.

System 100 may further comprise a plurality of base station devices 106, which may be any suitable electronic device configured to receive data transmitted from mobile device 102 (or other such devices). Base station devices 106 may be configured to receive data, via electronic transmission, from a portable mobile device (e.g., mobile device 102), wherein the data received includes information about electromagnetic signals detected by the mobile device 102. This means that mobile device 102 may transmit information to one or more base station devices 106 regarding the electromagnetic signals emitted by resident electronic devices 108 and/or by BLE-emitting devices 116 and detected by mobile device 102. The one or more base station devices 106 may include one or more processors for determining, based on the information pertaining to the electromagnetic signals emitted by resident electronic devices 108 and/or by BLE-emitting devices 116, a location of mobile device 102 in environment 104, as well as an inventory of items (e.g., equipment, supplies) associated with a BLE-emitting device 116 and located in the same vicinity as mobile device 102.

In some embodiments, the one or more base station devices 106 may be configured to transmit information, via electronic transmission, to one or more remote computing devices, such as remote system 112 in system 100. The one or more remote computing devices may include one or more processors. As explained in further detail below, the information transmitted to remote system 112 (e.g., information regarding the electromagnetic signals emitted by resident electronic devices 108 and/or by BLE-emitting devices 116 and detected by mobile device 102) may be used by system 100 to determine a location of mobile device 102 in environment 104, as well as an inventory of items (e.g., equipment, supplies) associated with a BLE-emitting device 116 and located in the same vicinity as mobile device 102.

In some embodiments, one or more of base station devices 106 may be a device configured to receive transmissions from mobile device 102 via long-range communications at a low bit rate, such as by a LPWAN protocol or any other suitable wireless communication protocol. In some embodiments, one or more of base station devices 106 may be a LPWAN device configured to "listen" for LPWAN transmissions from portable mobile devices. In some embodiments, one or more of base station devices 106 may be configured to execute outbound transmissions of data (e.g., transmissions of data to remote system 112) via Ethernet, Wi-Fi, and/or one or more other communication protocols supporting a higher bit-rate than the inbound LPWAN transmissions received by the device.

In some embodiments, remote system 112 may be any remote system or server which may communicate with other components of system 100 by electronic network communication. In some embodiments, remote system 112 may include one or more cloud-based systems, or may be provided in whole or in part by one or more cloud-based systems. Remote system 112 may be configured to, by one or more processors, execute one or more processes, as explained in further detail below, to receive information regarding location-determination of a mobile device, process the information received, and transmit information regarding location-determination of the device.

Remote system 112 may also comprise one or more computer storage devices (e.g., databases) configured to store information regarding location-determination of devices in system 100, including instructions for performing location-determination methods as disclosed herein and/or data (e.g., configurations and/or settings for systems and/or devices, historical logs, etc.) regarding one or more location-determination systems such as system 100.

In some embodiments, a single system such as remote system 112 may be configured for simultaneous use in more than one system for location-determination and/or asset tracking. Thus, while remote system 112 may be a part of system 100 as shown, the same remote system 112 may also be a part of other indoor location-determination and/or asset tracking systems for locating devices and tracking assets in other environments, and remote system 112 may function in a same or similar manner (as described in further detail herein) for those other systems as it does for system 100.

System 100 may also include administrator device 114, which may be any one or more computing devices configured to be used by a system administrator to control one or more functionalities of system 100. In some embodiments, administrator device 114 may include a desktop computer, laptop computer, mobile electronic device, tablet, smartphone, workstation computer, or the like. In some embodiments, administrator device 114 may be configured to receive alerts and notifications generated by remote system 112 regarding location-determination of one or more devices in system 100. In some embodiments, administrator device 114 may be configured to accept inputs to control one or more settings and/or functionalities of system 100. In some embodiments, administrator device 114 may be configured to display and accept inputs via a graphical user interface.

In some embodiments, system 100 may include a mapping or implementation stage. The mapping/implementation stage may include surveying or mapping environment 104 to determine the existence and location of resident devices 108. Once the mapping/implementation stage has been completed, then a location/tracking component may be executed, wherein the location/tracking component includes identifying the location of mobile device 102 (and accompanying items via tags 116) based on the known locations of resident devices 108, which was established during the mapping/implementation stage. The location/tracking stage is described in detail further below.

In some embodiments, system 100 comprises mapping device 110, which may be any mobile/portable electronic device configured to be movable about environment 104. Mapping device 110 may be configured to detect signals emitted by resident devices 108 and transmit information regarding said signals to remote system 112. (Resident devices 108 may include stationary or permanent devices, mobile devices, or semi-mobile devices.) The signal information detected by mapping device 110 may be used for development of a signal map of environment 104. As explained above, the signal map of environment 104 may be used during a location/tracking component to determine the location of mobile device 102 and one or more items/assets associated with a BLE-emitting device 116. For example, system administrators may move one or more mapping devices 110 about environment 104 in order to detect signals from devices 108 and gather information about the strength, location, and other characteristics of the different signals emitted by devices 108; this information may then be used to create a signal map of environment 104, such that information collected at a later time about signals detected by a mobile device (e.g., mobile device 102) during a location/tracking component may be compared to the signal map in order to determine a location of the device within environment 104.

In some embodiments, mapping device 110 may comprise one or more antennas configured to detect electromagnetic signals emitted by one or more resident devices 108 in environment 104. As mapping device 110 moves about different locations within environment 104, it may detect signals from different devices 108, and may detect those signals at different strengths; the identity and characteristics of those signals detected by mobile device 102 may be used, as discussed below, to develop a signal map of environment 104.

In some embodiments, mapping device 110 may share one or more characteristics in common with mobile device 102. For example, mapping device 110 and mobile device 102 may have same or similar dimensions and configurations, may be fabricated from same or similar materials, and may comprise one or more same or similar antennas. In some embodiments, mapping device 110 and mobile device 102 may be the same, including the same make and model. In some embodiments, one or more of the same devices may be used as both mapping device 110 and mobile device 102. In some embodiments, devices having one or more of the same antennas may be used as mapping device 110 and mobile device 102. In some embodiments, a device configured for use as mobile device 102 may be used as mapping device 110. In some embodiments, a plurality of devices configured for use as a mobile device (e.g., mobile device 102) may be used as part of mapping device 110, including by using multiple mobile devices as part of a single mapping device.

In some embodiments, system 100 comprises a plurality of mapping devices, of which mapping device 110 may be a single device, such that each of the multiple mapping devices may be movable throughout environment 104. In some embodiments, each of a plurality of mapping devices are identifiable by system 100, such as by a unique device identifier or other metadata. In this way, multiple mapping devices may be used for mapping within the same environment. In some embodiments, operations performed at implementation by mapping device 110 may capture and transmit a larger amount of data than is captured and/or transmitted during the location/tracking stage; thus, mapping device 110 may, in some embodiments, be configured to transmit the data that it captures by one or more transmission protocols having a higher bandwidth than one or more transmission protocols used at the location/mapping stage. For example, while data may be transmitted from mobile device 102 using LPWAN at the location-determination stage, data may also be transmitted from device 110 using Wi-Fi.

In some embodiments, at the mapping/implementation stage, multiple scans of the same location may be performed. In some embodiments, rather than relying on specific signals from predetermined and/or dedicated location-determination beacons, the device used for the mapping/implementation may detect electromagnetic signals from Wi-Fi access points, Bluetooth devices, portable electronic devices such as phones and tablets, personal computers, and/or any number of IoT devices such as network-enabled appliances and infrastructure equipment. Using data regarding characteristics of the signals collected at various different physical locations in the indoor environment, a model (e.g., a signal map) of the indoor environment may be generated and stored, wherein the model (e.g., signal map) comprises information about the kinds of signals that can be expected to be detected (e.g., at future times during a location/tracking stage of operation) at various different physical locations in the indoor environment.

In the example of FIG. 1, signals from devices 108 in environment 104 may be detected by mapping device 110. Data regarding some or all of the signals detected may be transmitted from mapping device 110 to one or more base stations 106, following optional processing, paring, and/or augmentation by mapping device 110 of the data collected.

In some embodiments, processing the data may generate a signal profile to be transmitted from mapping device 110. Optionally following further processing, paring, and/or augmentation of the data by one or more of base stations 106, the data may then be transmitted from one or more of base stations 106 to remote system 112. Remote system 112 may then process the data regarding some or all of the signals detected by mobile device 102 in order to generate and store a model of environment 104. In some embodiments, the model of environment 104 may be stored, for example in a database included in or accessible by system 112, as a signal map of environment 104. The model of environment 104 may be stored in any suitable manner such that data regarding signals detected by a mobile device (e.g., mobile device 102) at a future time may be compared to the model in order to determine a location in the environment based on matching or otherwise corresponding data between the data collected by the mobile device and the data represented in the model.

Figure 2:
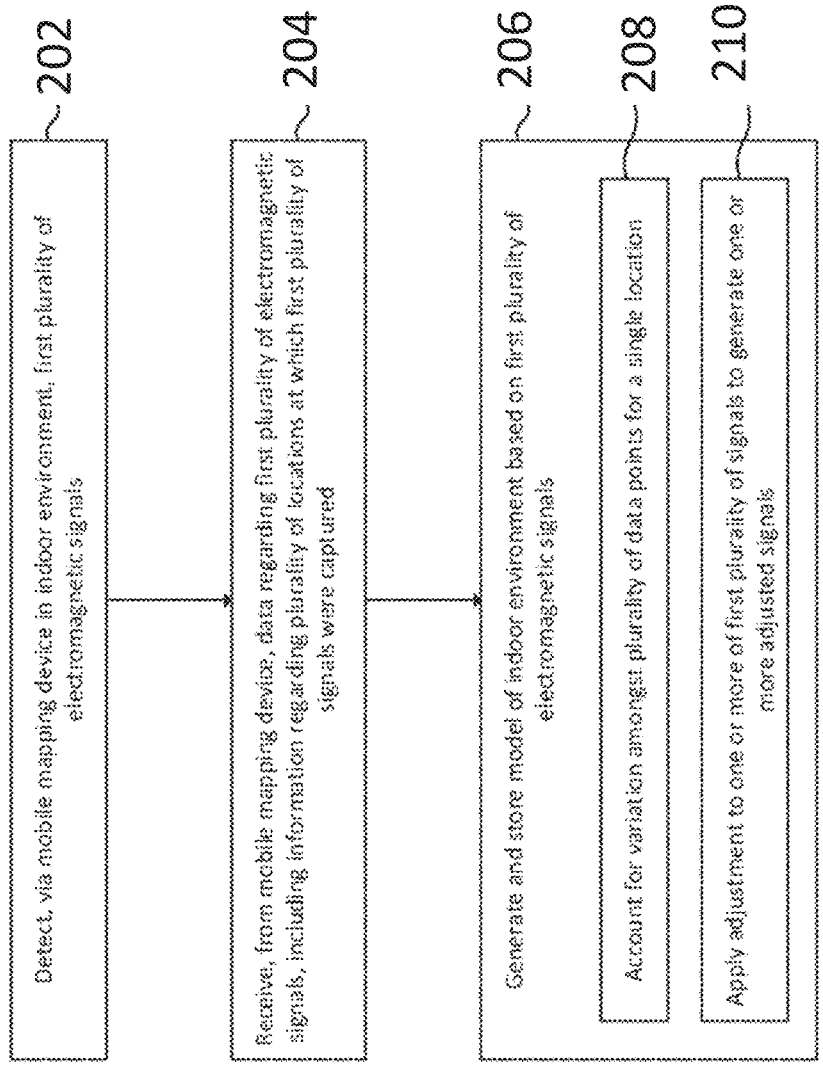
FIG. 2 shows a flow chart showing a method for mapping/implementing a location-determination system, according to some embodiments.

FIG. 2 shows a flow chart showing a method 200 for implementing a location-determination system (i.e., using an implementation component, such as that described above), according to some embodiments. Method 200 may be performed by system 100 as discussed above with respect to FIG. 1.

At block 202, the system can detect, via a portable mapping device in an indoor environment, a plurality of electromagnetic signals. In the example of system 100, mapping device 110 may detect a plurality of electromagnetic signals emitted by devices 108. As discussed above, said signals may be detected from various Wi-Fi access points, Bluetooth devices, portable electronic devices such as phones and tablets, personal computers, and/or any number of IoT devices such as network-enabled appliances and infrastructure equipment. As discussed above, in some embodiments, said signals do not include signals emitted by dedicated devices or beacons such as base station devices 106.

As discussed elsewhere herein, signals may be collected from various different locations within environment 104, and more than one reading may in some embodiments be taken for a single location inside environment 104. In some embodiments, detecting an electromagnetic signal may comprise detecting a signal type, signal strength, signal band, signal frequency, identity, and/or type of a device/antenna generating the signal.

At block 204, the system may receive, from the mobile mapping device, data regarding the plurality of electromagnetic signals, including information regarding a plurality of locations at which the plurality of signals were captured. In some embodiments, this step may comprise the mobile mapping device transmitting data regarding some or all captured signals for additional processing (and for eventual use in development of the map of the indoor environment) by the system. For example, mapping device 110 may transmit (e.g., via wired or wireless electronic transmission) data regarding the electromagnetic signals to remote system 112. In some embodiments, mapping device 110 may be configured to transmit the data regarding the plurality of electromagnetic signals by one or more transmission protocols having a higher bandwidth than one or more transmission protocols used at the location/tracking stage (see below). For example, while data may be transmitted from mobile device 102 using LPWAN at the location/tracking stage, data may be transmitted from device 110 at block 204 using Wi-Fi.

In some embodiments, information about a time of detection of a signal, location of detection of a signal, signal type, signal strength, signal band, signal frequency, identity and/or type of a device/antenna generating the signal, identity, and/or type of a device/antenna that detected the signal, and/or any metadata regarding the signal or a device/antenna emitting the signal or a device/antenna detecting the signal may be transmitted from mapping device 110 to remote system 112 (or, in some embodiments, any one or more pieces of said information may be associated with one or more other pieces of said information by remote system 112 following transmission of the signal from mapping device 110).

In some embodiments, the system may filter the data regarding the plurality of electromagnetic signals, for example to remove unreliable and/or transient signals and to focus on only the most reliable signals. This may be done, for example, by using a predefined whitelist of the most reliable and/or useful signals in order to select all whitelisted signals, or to select a predefined number of the most-preferred whitelisted signals detected by the device. In some embodiments, only certain types of signals may be selected, while other types of signals (e.g., those associated with devices expected to be transient, unreliable, or frequently moved about) may be removed from the pool of signals. In this way, the system may use electromagnetic signals that are present in an indoor environment due to preexisting electronic devices, but may filter out signals from equipment that may not be expected to be reliable for mapping and/or location-determination purposes, such as mobile phones and wearable devices that are highly likely to be frequently moved and/or to have not been present at all during the mapping/implementation stage. In some embodiments, the system may filter the signals based in whole or in part on signal strength. For example, stronger signals may be selected while weaker signals may be discarded. In some embodiments, only signals having a strength above a predefined threshold may be selected. In some embodiments, signals may have to be whitelisted and also meet signal strength requirements in order to be selected (e.g., to not be discarded). In some embodiments, filtering of the signals may be done by a remote system or server (e.g., system 112). In some embodiments, filtering of the signals may be done before and/or after transmitting signal data from the mapping device (e.g., device 110). Once the system has filtered the detected signals, the filtered signals may then be used to generate a model of the environment, as discussed below.

At block 206, in some embodiments, the system generates and stores a model of the environment based on the plurality of electromagnetic signals. In some embodiments, the model may be generated and stored in the form of a signal map. In the example of system 100, the model may be generated by remote system 112, and may be stored at or by remote system 112 in any suitable database or other computer storage.

In some embodiments, characteristics of the signals that are detected and used to generate the model (e.g., signal map) may include time of detection of a signal, location of detection of a signal, signal type, signal strength, signal band, signal frequency, identity and/or type of a device/antenna generating the signal, identity and/or type of a device/antenna that detected the signal, and/or any metadata regarding the signal or a device/antenna emitting the signal or a device/antenna detecting the signal. In some embodiments, the model (e.g., signal map) may be based on one or more signal profiles (discussed further below) generated based on one or more characteristics of the signals detected.

In some embodiments, the model may be stored for future reference during a location-determination operation (e.g., method 300 below). In some embodiments, all or part of the model may be transmitted to one or more other computer devices, for example administrator device 114, for use by one or more users of the system.

At block 208, in some embodiments, generating and storing the model of the environment comprises accounting for variation amongst a plurality of data points for a single location. In some embodiments, during the mapping/implementation stage, multiple scans of the same location may be performed, and variations of detected signal characteristics across multiple scans of the same location may be used to determine expected and/or standard deviations that may be expected from a signal, and these expected and/or standard deviations may be accounted for in the model (e.g., signal map). For example, if a signal is observed in a plurality of locations, the signal may be treated differently in the model than a localized signal.

At block 210, in some embodiments, generating and storing the model of the environment comprises applying a respective adjustment to one or more of the plurality of signals to generate one or more respective adjusted signals.

In some embodiments, the signals captured at the mapping/implementation stage may be captured in a same or similar manner as the capture of signals at the location/tracking stage (explained below), including by using one or more antennas having one or more same or similar characteristics as antenna used at the location-determination stage. For example, antennas used at the mapping/implementation stage and at the location/tracking stage may have the same or similar dimensions and configurations, may be fabricated from same or similar materials, and/or may be provided in same or similar devices. In some embodiments, antennas used at the mapping/implementation stage and at the location/tracking stage may be the same, including the same make and model. In some embodiments, one or more of the same antennas may be used at both stages. In some embodiments, one or more of the same devices may be used at both stages. In some embodiments, a device configured for use in the location/tracking stage may be used at the mapping/implementation stage. In some embodiments, a plurality of devices configured for use in the location/tracking stage may be used at the mapping/implementation stage.

In some embodiments, when different devices and/or antennas are used during the mapping/implementation stage and the location/tracking stage (as discussed further below), one or more adjustments or modifications to the data captured at one or both stages may be applied to account for the differences between the different antennas. For example, data from previous usages of one or both devices/antennas may be used to apply a correction or adjustment to the data captured by an antenna during the mapping/implementation stage and/or to the data captured by an antenna during the location/tracking stage, such that the corrected/adjusted data can be expected to more closely mimic the data captured by the other antenna at the other stage. In some embodiments, applying adjustments in this manner may address the issue of different antennas reading signals at different strengths.

Following execution of the mapping/implementation stage, once a model of the environment has been created and stored, the system may then perform location/tracking operations to determine a location of a mobile device in the environment that has been modeled and/or the presence of one or more assets. In some embodiments, a mobile device may detect signals from one or more resident electronic devices in environment that was modeled at the mapping/ implementation stage, may optionally filter the detected signals (for example to generate a signal profile based on the detected signals), and may transmit data regarding some or all of the detected signals (e.g., the signal profile) to one or more base station devices positioned in the three-dimensional environment. Data may then responsively be transmitted from the one or more base station devices to a remote system, where the data may be compared to the model of the environment in order to determine a location in three-dimensional space of the mobile device. Once a location of the mobile device in the environment is determined, one or more alerts regarding the determined location may be generated, transmitted, and/or displayed.

Figure 3:
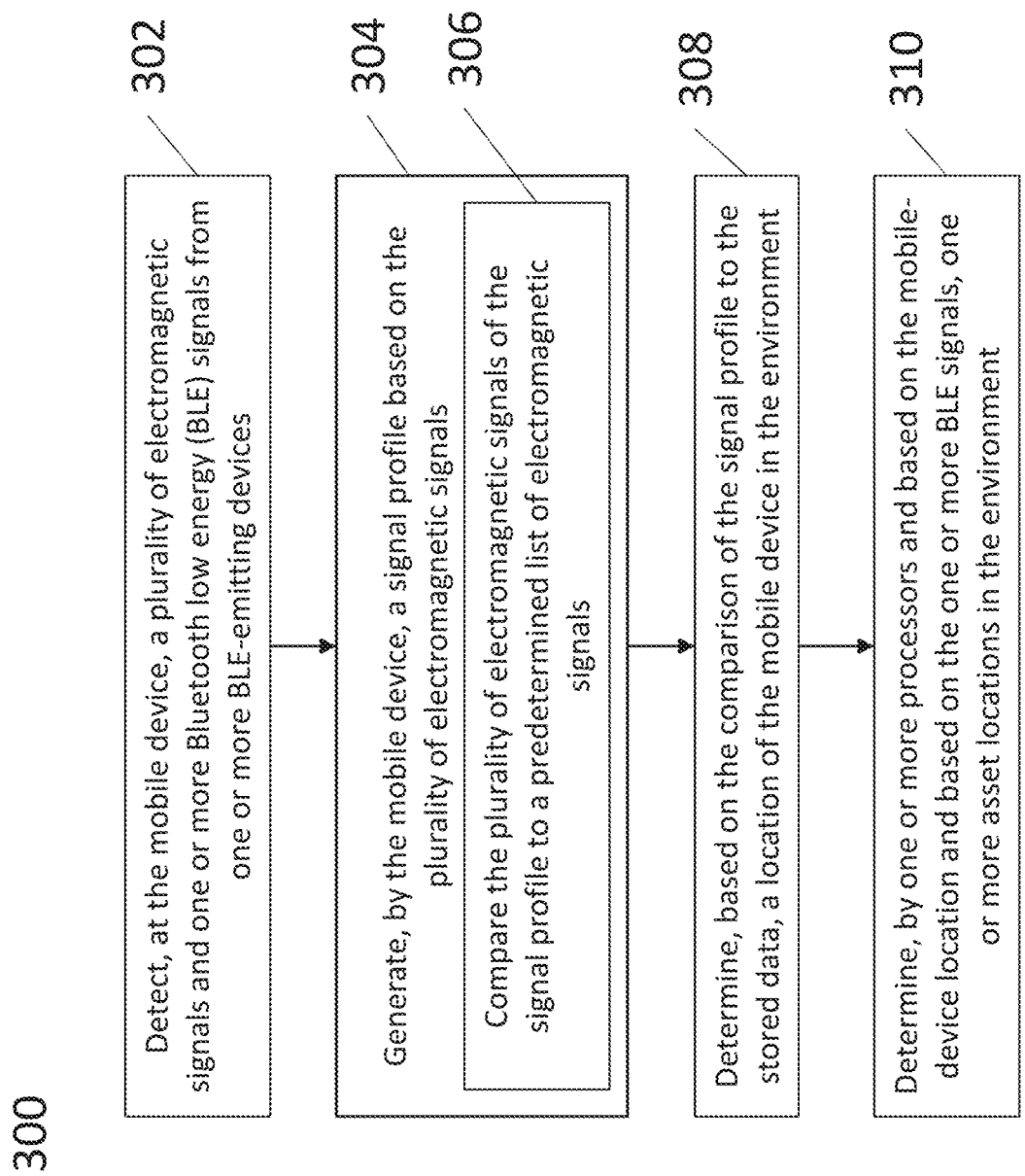
FIG. 3 shows a flow chart showing a method for tracking assets and determining a location of a mobile device using a location-determination system, according to some embodiments.

FIG. 3 shows a flow chart showing a method for tracking one or more assets (e.g., determining a location of one or more assets), according to some embodiments. In some embodiments, method 300 may be performed by system 100 as discussed above with respect to FIG. 1. As described below with reference to the example of FIG. 1, system 100 may be configured to determine a location of one or more of assets 116. The system may receive a request to track (e.g., to locate) an asset 116 and may responsively determine a location of mobile device 102. The location of mobile device 102 may be determined, as described herein, by causing mobile device 102 to scan ambient signals (e.g., signals emitted by devices 108) in the environment. An analysis of data regarding the ambient signals detected by device 102 may then be undertaken, and a location for device 102 may be determined on that basis. Mobile device 102 may also be caused to scan for signals that it can detect from assets 116. Once the location of device 102 is determined, the location of assets 116 that are detected by mobile device 102 may then be determined based on the location of mobile device 102, for example by determining that assets 116 whose signals are detected by device 102 are colocated (e.g., within a predefined or dynamically determined threshold distance) with device 102. If there are multiple mobile devices 102 that detect the signal from a single asset 116, the location of the asset 116 may be determined based the device 102 that received the strongest signal.

Method 300 may be initiated in any of several different ways. In some embodiments, the method may be initiated by detecting an input comprising an instruction to determine a location of a mobile device and/or a trackable asset in an environment. For example, the input may include a user executing an input, for example by using a GUI displayed on a computing device associated with an asset tracking system, and/or by pressing a button on a mobile device included in the asset tracking system.

In some embodiments, the method may be initiated by a request to search for or identify the location of a specific asset. For example, the system or a user of a system may initiate a search request (e.g., using a graphical user interface) that causes the system to determine a location for the requested asset. In some embodiments, determining a location for the requested asset may include determining a location for one or more mobile devices (different from the requested asset) within the asset tracking system, and thereafter determining the location of the requested asset based at least in part on the determined location of the one or more mobile devices. In some embodiments, causing the location of the one or more mobile devices to be determined may occur automatically in response to receiving the search request for the asset to be tracked. In some embodiments, determining locations within an environment for the one or more mobile devices may include causing the one or more mobile devices to each scan the environment for ambient signals from resident devices and/or nearby trackable assets, as described throughout this disclosure.

In some embodiments, in response to a search request, the mobile device may first scan the environment for nearby BLE devices emitting BLE signals. If, for example, a user is looking to identify the location of a specific asset, and the specific asset is identified by detecting a BLE signal from the specific BLE device associated with the specific asset, the mobile device may then responsively identify its own location by scanning the nearby environment for ambient signals from resident devices. Accordingly, the order in which the location determination steps occurs (e.g., location determination of the mobile device within the environment, and asset colocation determination) may vary depending on system configurations and/or user-specified settings.

In some embodiments, any one or more of the steps of method 300 may be performed automatically in accordance with a predefined schedule or cadence, for example by which different signal scans may be performed at predefined intervals and for predefined periods of time.

At block 302, in some embodiments, the system detects, by the mobile device in the environment, a plurality of electromagnetic signals and one or more Bluetooth low energy signals from one or more BLE-emitting devices. (It should be noted that this "plurality of electromagnetic signals" is distinct from the "plurality of electromagnetic signals" detected during the mapping/calibration stage, though the two pluralities of signals detected may share one or more characteristics with one another, including by including signals emitted from same or similar devices in the indoor environment.) The detection of these electromagnetic signals may, in some embodiments, be performed responsively to the input or trigger condition, or may be performed in accordance with a predefined schedule or cadence.

For example, in some embodiments, upon an instruction executed via a graphical user interface associated with the system, upon a button on a mobile device being pressed, upon an input being otherwise executed, and/or at a predetermined time interval, the mobile device may take a reading, using one or more antennas included in the mobile device, of electromagnetic signals that can be detected from its current location. As with the mapping/implementation stage, these electronic signals are, in some embodiments, not detected from predetermined and/or dedicated beacons (e.g., base station devices 106), but instead are detected from one or more of the same Wi-Fi access points, Bluetooth devices, portable electronic devices such as phones and tablets, personal computers, and/or IoT devices that were detected at the mapping/implementation stage. In the example of system 100, mobile device 102 detects electromagnetic signals emitted by resident devices 108.

In addition to taking the reading of the plurality of electromagnetic signals from various nearly ambient devices, the mobile device may additionally take one or more readings of BLE signals emitted by nearby BLE-emitting assets in the system. As compared to the collection of the plurality of signals from the various ambient devices, the collection of signals emitted by the BLE-emitting assets (e.g., assets 116) may be performed by the mobile device simultaneously (e.g., in response to the same input), beforehand, afterward, according to a same set of one or more inputs or trigger conditions, according to a different set of one or more inputs or trigger conditions, according to a same predefined cadence or schedule, and/or according to a different predefined cadence or schedule.

By scanning for BLE signals, the mobile device may detect BLE signals emitted by BLE devices (e.g., iBeacons)

associated with assets to be tracked within the system. In some embodiments, each BLE device may be associated with a universally unique identifier (UUID). For example, several UUIDs may be hardcoded, covering billions of potential tag combinations.

The mobile device may scan the environment for BLE signals being emitted from BLE devices, wherein the scans may be performed at certain intervals, and may be configured to last for certain durations. Furthermore, the BLE devices may be configured to broadcast BLE signals at certain intervals, and the broadcasts may last for certain durations. Scanning and/or broadcasting intervals, as well as scanning and/or broadcasting durations, may be predetermined or dynamically determined in accordance with one or more system settings or system conditions. For example, a mobile device may scan its surrounding environment every 30 minutes, every 60 minutes, or every 3 hours. (In some embodiments, in addition or alternatively to scanning at a predefined or dynamically determined interval, a mobile device may scan its surrounding environment in response to a user input and/or in response to one or more trigger conditions, such as a trigger condition including that movement of the device has begun, movement of the device has continued, and/or movement of the device has stopped.) In some embodiments, a BLE device may have a BLE transmission interval that is predetermined or dynamically determined in accordance with one or more system settings or system conditions. For example, a BLE device may transmit a signal at a regular internal (e.g., every 50 ms, 100 ms, 500 ms, 1 second, 5 seconds, 10 seconds, 1 minute, 5 minutes, 10 minutes, 15 minutes, 20 minutes, 30 minutes, 45 minutes, or 60 minutes). The mobile device scans may detect the emitted BLE signals when a scan and an emitted signal coincide.

In some embodiments, the information transmitted by a BLE device and detected by the mobile device may include identification information (e.g., a Beacon Major Value and a Beacon minor Value) and battery information (or other status information) for the BLE device. In some embodiments, a standard device identification information format (e.g., a standardized device ID format) may be modified such that a number of bits of the device identification information format are used to encode battery information (or other device status information). For example, two bits at the end of a standardized UUID format may be modified to specify a battery level for the device as an integer between 00 (lowest battery level) and 99 (highest battery level). In some embodiments, the mobile device may compare a received modified UUID to a predefined list of UUIDs known to be present in the system in order to determine a fuzzy match that determines the identity of the transmitting BLE device. The non-matched bits may then be identified and those bits may be used by the mobile device to read battery level information (or other encoded device status information).

In some embodiments, identification information broadcasted by BLE devices may be configured to rotate over time according to one or more predefined or dynamically generated rotation schemes, which may help prevent malicious spoofing of BLE devices.

Upon receiving the information transmitted by the BLE device, the mobile device may additionally determine signal strength information (e.g., RSSI) for the received signal. The signal strength information may be stored in association with the information content (including the device identification information and battery/status information).

During each scan, the mobile device may detect one or more BLE signals. With the received information, the method/system can determine from which BLE device the BLE signal originates, based on the identification information (e.g., Major Value and minor Value) in the transmitted signal (and may thus determine which asset is associated with the BLE device). From the received information, the method/system may further determine a measure of reliability that the BLE device (and associated asset) is proximate to the detecting mobile device, based on the RSSI.

It should be noted that, because battery level information (or other device status information) for BLE device will be expected to change over time, the data broadcast by the BLE device may change over time to reflect changes in battery level (or other device status).

At block 304, in some embodiments, the system generates, by the mobile device, a signal profile based on the plurality of electromagnetic signals (e.g., based on some or all of those ambient signals collected from nearby devices 108). In some embodiments, the signal profile may be configured to be transmitted from the mobile device and compared to stored data for efficient and accurate determination of a location of the mobile device. In some embodiments, a data profile may be configured to have a sufficiently compact data size for fast, efficient, low-bandwidth, and/or reliable transmission from the mobile device.

In some embodiments, generating the signal profile may comprise performing data processing, data paring, and/or data augmentation to data regarding some or all of the detected signals. In some embodiments, the signal profile may comprise data regarding the detected signals. In some embodiments, the signal profile may comprise data regarding a subset of the detected signals (e.g., as distinct from data regarding all of the detected signals).

In some embodiments, the data profile may be generated (based on the collected signal data) at the mobile device (e.g., at device 102). In some embodiments, the data profile may be generated by a central server to which the raw signal data is transmitted by the mobile device.

At block 306, in some embodiments, generating the signal profile comprises comparing the plurality of electromagnetic signals to a predefined list of electromagnetic signals. In some embodiments, this comparison can be used to select a subset of the plurality of electromagnetic signals, based on the predefined list, whereby the signal profile may be based on the subset of selected signals.

In some embodiments, from the detected signals, the mobile device (e.g., mobile device 102) may filter out a subset of the signals, for example to remove unreliable and/or transient signals and to focus on only the most reliable signals. This may be done, for example, by using a predefined whitelist of the most reliable and/or useful signals in order to select all whitelisted signals, or to select a predefined number of the most-preferred whitelisted signals detected by the device. In some embodiments, only certain types of signals may be selected, while other types of signals (e.g., those associated with devices expected to be transient, unreliable, or frequently moved about) may be removed from the pool of signals. In this way, the system may use electromagnetic signals that are present in an environment due to preexisting electronic devices, but may filter out signals from equipment that may not be expected to be reliable for location-determination purposes, such as mobile phones and wearable devices that are highly likely to be frequently moved and/or to have not been present at all during the mapping stage. In some embodiments, the system may select a subset of signals based in whole or in part on one or more other criteria, such as (but not limited to) signal strength criteria. For example, stronger signals may be selected while weaker signals may be discarded. In some embodiments, only signals having a strength above a predefined threshold may be selected. In some embodiments, signals may have to be whitelisted and also meet signal strength requirements and/or other criteria in order to be selected for the subset of signals. Once the mobile device has selected a subset of the detected signals the device may transmit data regarding those selected signals (e.g., in the form of the signal profile) such that the signal data (e.g., the signal profile) may be used to locate the mobile device in environment.

In some embodiments, filtering detected signal to a subset of the signals and/or generation of a signal profile may be performed by a component of the location-determination system other than the mobile device (for example, it may be performed by a central server of the system). However, in some embodiments, performing filtering and/or generation of a signal profile at the mobile device itself may be advantageous because it may minimize the amount of data that is transmitted from the mobile device, thereby increasing speed, efficiency, and reliability of data transmissions.

In some embodiments, the mobile device may transmit, via a transmission device of the mobile device, the signal profile to one or more base stations. In the example of system 100, the one or more base stations may be one or more of base station devices 106. The one or more base stations may be configured to then transmit the signal profile to a central server, such as remote system 112. In some embodiments, the mobile device may be configured to (alternatively or additionally) transmit the signal profile directly to a central server for processing/analysis, rather than transmitting the signal profile via one or more intermediate devices or systems such as a base station.

In some embodiments, the transmission may be performed via a wireless transmission device of the mobile device, such as a wireless transmitted configured to send one or more messages via Wi-Fi, Bluetooth, and/or LPWAN transmission. In some embodiments, transmitting data from the mobile device to a LPWAN-enabled base station using an LPWAN transmission may improve reliability of the transmission and decrease bandwidth and energy requirements. In some embodiments, using LPWAN transmissions may obviate the need for unreliable and/or cumbersome pairing operations that may be required for Wi-Fi data transmissions.

In some embodiments, the base stations/antennas (e.g., LPWAN base stations/antennas, base station devices 106) may be positioned in or around the environment such that the mobile device may transmit the data regarding the selected signals (e.g., the signal profile) to one or more of the base stations/antennas, and the one or more base stations/antennas may thereafter optionally transmit that data (and/or related data) to a server or processor, on or off of the premises, configured to determine a location of the mobile device. Base stations/antennas may be positioned in and/or about the environment such that coverage of the indoor environment is completely redundant; that is, the base stations/antennas may be positioned such that no location in the environment will experience a coverage failure due to the failure of a single base station/antenna.

In some embodiments, other data regarding the detected signals, alternately or in addition to the signal profile, may be transmitted from the mobile device.

In some embodiments, the mobile device transmits the signal profile from the one or more base stations to a remote server. In the example of system 100, data may be transferred from one or more of base station devices 106 to remote system 112.

In some embodiments, data may be transmitted from any one or more base station devices to one or more on- or off-site servers, processors, or systems for additional processing, such as for comparison of a signal profile to a model of the environment to determine a location of the mobile device. In some embodiments, transmission of data from the one or more base stations may be executed by any wired or wireless network communication protocol, including but not limited to Ethernet transmission and/or Wi-Fi transmission.

In some embodiments, all data received from a mobile device by a base station device may be re-transmitted by the base station device; in some embodiments, only some of the data received from a mobile device by a base station device may be re-transmitted by the base station device; in some embodiments, modified and/or additional data received from a mobile device by a base station device may be transmitted by the base station device.

In some embodiments, transmission of data by the base station device may be performed automatically in response to detecting and receiving the transmission from the mobile device.

In some embodiments, transmission of data for determining a location of the mobile device (e.g., signal profile data) from the mobile device to the base station may be performed using a first message format. The first message format may include a string of characters arranged into predefined fields where a set of one or more first fields indicate identity information (e.g., MAC ID information) for detected devices and a set or one or more second fields (e.g., located immediately following and adjacent to their pair-wise corresponding first fields) indicate corresponding signal strength (e.g., RSSI) information for the detected devices.

In addition to transmitting data for determining a location of the mobile device (e.g., signal profile data), the mobile device may also transmit data collected from one or more BLE-emitting assets to be tracked, such as assets 116, as described herein.

In some embodiments, any one or more characteristics of transmission of signal profile data (and/or other data related to the plurality of signals collected from devices such as devices 108) may apply, in whole or in part, to transmission of signal data (including raw signal data and/or processed signal data) collected from one or more BLE-emitting assets to be tracked, such as assets 116. For example, data regarding BLE signals detected from one or more assets 116 may be transmitted to a central server (e.g., remote system 112) directly via one or more wireless network communication protocols and/or indirectly via one or more intermediary devices such as one or more base station devices 106.

In some embodiments, the mobile device may be configured to select a subset of BLE-device signal data that it has received, and the mobile device may transmit information regarding only the selected subset of BLE-device signal data. For example, in some embodiments, the mobile device may select the subset of BLE-device signals by using a whitelist and/or blacklist, for example by selecting only those signals that indicate a whitelisted UUID or other device identifier. In this manner, the mobile device may upload information regarding BLE signals detected from asset-tracking devices that are configured for use in the asset tracking system, and not from other BLE signal-emitting devices.

Additionally or alternatively, in some embodiments, the mobile device may select the subset of BLE-device signals based on signal strength (e.g., RSSI) for the signal. For example, the device may select only those signals for which signal-strength exceeds a predefined threshold. Alternately, the device may select a predefined number of top-signal-strength signals (e.g., the top 10, top 30, or top 100 signals collected over a period of time). Alternately, the device may apply both signal-strength criteria, for example by selecting a predefined number of top-signal-strength signals whose signals exceed a minimum signal-strength threshold.

The one or more selected BLE signals may be stored in such a way that the signal identity, RSSI information, and/or battery/status information is associated with the specific time interval (such that a user can later identify where a specific asset was within the environment at the time the scan was performed). In some embodiments, only the strongest BLE signals based on the RSSI of the signal will be stored (e.g., the 5, 10, 15, 20, 30, 40, or 50 strongest BLE signals), forming a "queue". In some embodiments, the queue may be dynamic such that the strongest signals (for example, the strongest 30 signals) may be updated with each interval scan.

Selection of a subset of detected BLE signals may be performed at the time of scanning and/or after a scan is completed.

In some embodiments, the mobile device may perform selection of the subset of BLE-device signals for transmission to a base-station or central system upon receiving an input requesting transmission of BLE-device signal information. In some embodiments, the mobile device may continuously monitor for BLE-signals (e.g., by collecting BLE signals continuously at all points over time, or by collecting BLE signals according to a schedule or cadence). The mobile device may, in some embodiments, establish and update the selected subset over time, for example by establishing a queue of BLE signals over time, for example by compiling a set of a predefined number (e.g., 10, 30, 50) of BLE signals having the highest signal strength detected during a certain time period. With each scan, the mobile device may select the BLE signals that meet one or more selection criteria (e.g., being whitelisted and/or exceeding a minimum signal strength criteria) and may assess whether the signal should be added to the running queue of the highest-signal-strength BLE signals. The mobile device may then transmit BLE signal data (for example using the message formats disclosed herein) representing the running queue, wherein the transmission may be made in response to an input/request and/or according to a predefined schedule or cadence. Thus, the mobile device may establish a queue of the highest-signal-strength BLE-transmitting assets, may update the queue iteratively with each BLE scan performed by the mobile device, and may upload the queue to the central system intermittently In some embodiments, the information regarding the BLE-emitting devices that is transmitted by the mobile device to the base station and/or to the central server may be of one or more message types (wherein the message types may all be of the second message format, as described below). For example, a first message type may include signal strength information for one or more BLE devices, while a second message type may include battery level information for one or more BLE devices (or other device status information). In some embodiments, a third message type may include information indicating that BLE devices detected, and/or signal strength information, and/or battery information has not changed since a previous transmission was made.

In some embodiments, transmission of data collected from one or more BLE-emitting assets to be tracked, from the mobile device to the base station, may be performed using a second message format that differs from the first message format (used for transmitting information for determining a location of the mobile device) described above.

The second message format may include a string of characters arranged into a header portion and a body portion. The header portion of the message format may include a plurality of header fields, and the body portion may include a plurality of body fields.

The header portion may include a first header field, a second header field, and a third header field.

A first header field may indicate a message type. For example, the first header field may include a single character that indicates whether the message is of a first type, a second type, or a third type.

A second header field may indicate an identity of a set of BLE-emitting assets, for example by indicating a UUID associated with the set of BLE-emitting assets, wherein each of the BLE-emitting assets indicated by the data in the body of the message (as described below) corresponds to the indicated UUID. In some embodiments, the system may be configured such that identity information for the set(s) of BLE-emitting assets that will be collected and transmitted by the system is predefined; for example, a predefined set of one or more UUIDs may be hard-coded into the system, such that only BLE-emitting assets with one of those UUIDs will be tracked.

A third header field may indicate an identity of a subset of BLE-emitting assets, wherein the subset is a subset of the set indicated by the second header field. For example, the third header field may indicate a major value associated with the subset of BLE-emitting assets, wherein each of the BLE-emitting assets indicated by the data in the body of the message (as described below) corresponds to the indicated major value.

The body portion may include a first set of one or more first body fields and a set of one or more second body fields, wherein first body fields correspond pair-wise to corresponding second body fields.

A first body field may indicate identity information for a specific detected BLE-emitting asset, wherein the specific emitted BLE-emitting asset is in the subset and in the set indicated by the header of the message. For example, the first body field may indicate a minor value for the BLE-emitting asset.

A second body field may indicate information associated with the specific detected BLE-emitting asset identified in a corresponding first body field.

If the message is of a first message type as indicated by the first header field, then the second body field may indicate signal strength information associated with the specific detected BLE-emitting asset, for example RSSI information indicating a signal strength that was detected by the mobile device when detecting the signal emitted by the BLE-emitting asset.

If the message is of a second message type as indicated by the first header field, then the second body field may indicate battery information associated with the specific detected BLE-emitting asset, for example by indicating a percentage of remaining battery life, an estimated remaining battery life time, or the like.

In some embodiments, if the message is of a third message type as indicated by the first header field, then the body portion of the message may be blank, or may be ignored by the system. As described above, a third message type may indicate to the system that BLE-emitting assets detected, and/or signal strength information, and/or battery information has not changed since a previous transmission was made.

In some embodiments, additional or alternative message formats using other data encoding schemes may be used. For example, an encoding scheme that uses hashes that are not human-readable and that require computerized analysis to decode may be used.

At block 308, the system may determine, based on a comparison of the signal profile to stored data regarding signal profiles at a plurality of locations in the environment, a location in the environment of the mobile device. In some embodiments, this determination may be performed by a remote server, processor, or system to which data is transferred from the base station(s). In the example of system 100, this determination may be performed by one or more processors of remote system 112 or by one or more processors of the one or more base stations 106.

In some embodiments, the stored data regarding signal profiles at a plurality of locations in the environment may comprise, or may be provided in the form of, a model of the environment and/or a signal map such as those discussed above with respect to the mapping/implementation stage and method 200. In some embodiments, once in receipt of the data regarding the selected signals, the server or processor may determine the location in environment of the mobile electronic device by comparing the data regarding the selected signals to the signal map generated at the mapping/implementation stage. In some embodiments, the system may apply one or more matching algorithms to determine which one or more of the mapped locations most closely match the data received about the selected signals that were detected by the mobile device. The system may then determine that the mobile device is located in the environment at or near one or more of the locations indicated in the signal map as the closest match(es) to the data regarding the selected signals detected by the mobile device.

At block 310, the system determines, by one or more processors, based on the location of the mobile device determined at block 308, and based on the one or more BLE signals, one or more asset locations within the environment. As described above, the system may, in some embodiments, determine that an asset whose BLE signals were detected by the mobile device is located at a same or similar location as the location determined for that mobile device. Thus, the determined asset location may correspond to the mobile device location, in that the determined location may be a same location, a similar location, and/or a proximate location (e.g., within a predetermined or dynamically determined distance threshold).

In some embodiments, the system may determine that a BLE-emitting asset indicated in a subset of BLE signals uploaded by a mobile device is located within a predefined physical proximity of the uploading mobile device. For example, it may be determined that the asset is in a same room, a same floor, or within a predefined physical distance of the mobile device's determined location at the time the scan detecting the BLE-emitting asset was performed.

In some embodiments, the system may determine the location of the BLE-emitting asset by estimating a physical distance of the asset from the associated mobile device that detected the BLE signal. For example, the system may use signal-strength (e.g., RSSI) to estimate the distance of the BLE asset from the mobile device at the time the BLE signal was detected (e.g., by determining that a stronger signal-strength indicates a closer physical proximity).

In the example of system 100, upon determining a location of mobile device 102 and/or one or more nearby assets, remote system 112 may transmit information regarding the determined location and/or the determined asset location(s) to administrator device 114. In some embodiments, the remote system 112 can continue to transmit location data and/or asset location data until an alert is resolved. In some embodiments, the remote system 112 can provide Real Time Location Services (RTLS) as the mobile device 102 is moving, a Last Known Location message once mobile device 102 has stopped moving, and/or the remote system 112 may provide periodic location notices (time based). The information transmitted to administrator device 114 may cause administrator device 114 to display or otherwise output information regarding the determined location, such that a system administrator may be made aware of the determined location and any associated information (e.g., asset location information).

In some embodiments of asset tracking systems integrated into location-determination systems such as those described herein, mobile devices may be configured to send intermittent diagnostic signals to one or more other components of the system, including information regarding their location, health, usage history, battery level (e.g. remaining battery life), and the like. In some embodiments, diagnostic signals may be sent at a predetermined time, after a predetermined period of time has passed since a last usage or a last diagnostic message, when a device is in a predetermined location, when a device detects a malfunction or other predetermined trigger event, and/or when a device is at or below a predetermined battery level.

In some embodiments, asset tracking systems integrated into location-determination systems such as those described herein may comprise a textual and/or graphical user interface (hereafter simply referred to as a GUI) accessible by workstation, computer, laptop, tablet, and/or mobile phone. In the example of system 100, a GUI may be displayed by administrator device 114, such that a user of administrator device 114 may view information about environment 104, mobile device 102 (and other mobile devices in the environment), BLE devices 116, and system 100 generally. In some embodiments, the GUI may provide visual alerts, audible alerts, and/or alerts transmitted to one or more remote electronic devices (such as alerts transmitted by text message and/or email). In some embodiments, the GUI may display information regarding devices that have been triggered (e.g., devices on which a button has been pressed) and/or devices that have not contacted the system for a diagnostic check-in for greater than a predefined threshold period of time. In some embodiment, the GUI displayed by administrator device 114 may also enable a user of administrator device 114 to execute inputs to control one or more functionalities of system 100. In some embodiments, the GUI may include a virtual dashboard interface for viewing information about system 100 and/or executing commands to control system 100.

Figure 4:
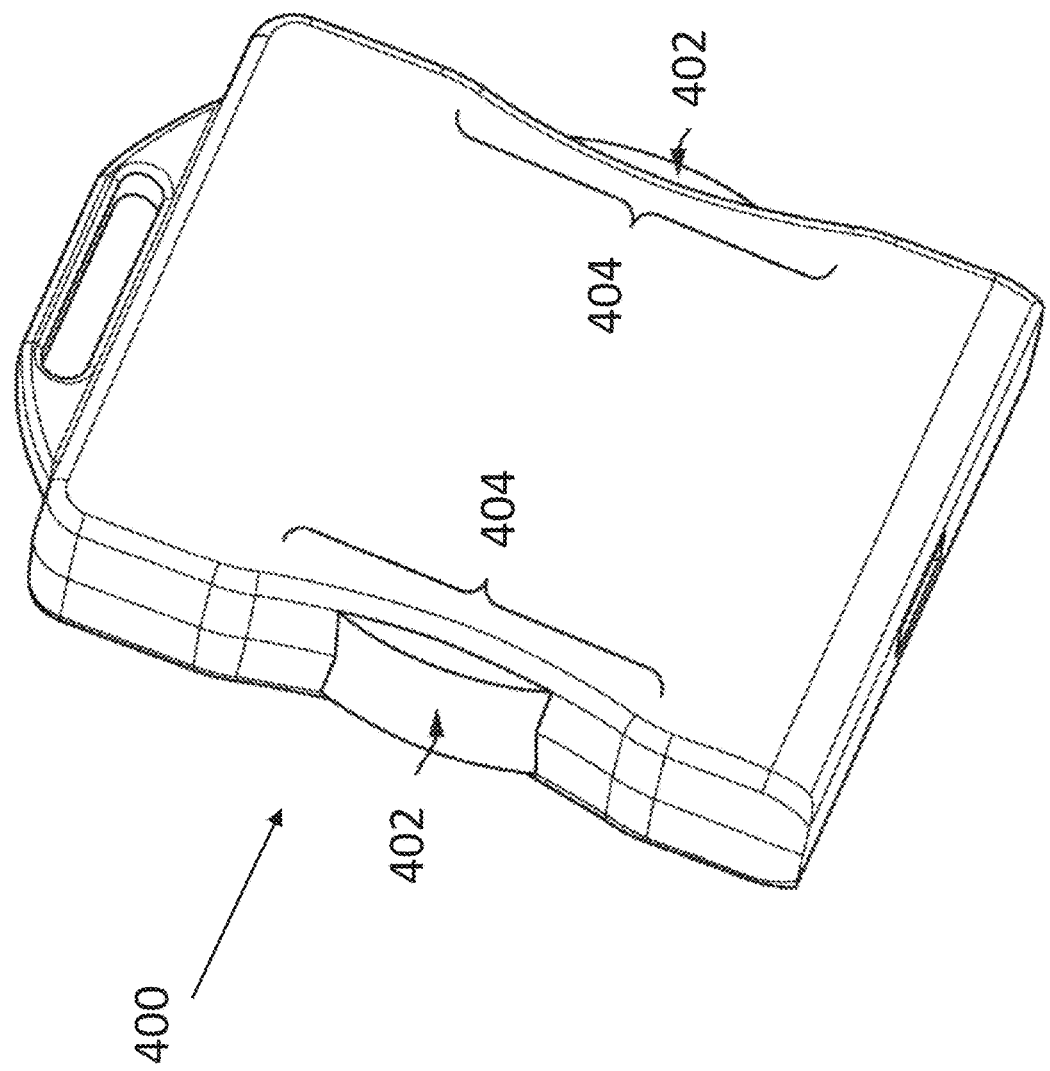
FIG. 4 shows a wearable mobile device, according to some embodiments.

FIG. 4 shows a mobile device 400, in accordance with some embodiments. In some embodiments mobile device 400 may be used as mobile device 102 in system 100, as described above. In some embodiments, pressing one or more of buttons 402 may cause device 400 to execute one or more location-determination operations, including but not limited to detecting one or more signals from resident electronic devices (e.g., devices 108) by one or more antennas included in device 400, processing and/or filtering detected signals as discussed further below, and/or transmitting information regarding the signals detected to one or more other components of a location-determination system such as a base station (e.g., one or more of base station devices 106).

In accordance with some embodiments, mobile device 400 may be utilized with assets of interest (or assets to be tracked), such as laundry, housekeeping, and luggage carts, room service tray returns, expensive consumables, and holiday decorations, among others. For example, such assets may be tracked such that an administrator can identify the location of a specific asset at specific points in time. Each trackable asset may be associated with a BLE device (e.g., BLE tag or a device/computer emulating a BLE tag). The mobile device 400 may be configured to receive/detect the signals emitted from the BLE devices and determine, based on the identified location of the wireless alarm device and the BLE signals from the BLE devices, one or more asset locations.

In some embodiments, asset tracking systems such as those described herein may include one or more BLE-emitting anchor beacons. A BLE anchor beacon may be a BLE-emitting device that is provided in a fixed and known location in the asset-tracking environment. Rather than using BLE signals emitted from the anchor beacon to determine the location of the anchor beacon, the system may be configured such that BLE signals emitted from the anchor beacon are used to determine the location of one or more devices that detect the signal, such as the mobile devices described herein. In some embodiments, the system may determine that a mobile device detecting a BLE signal from a BLE anchor beacon is within a predetermined proximity of the BLE anchor beacon. In some embodiments, the system may use the BLE signal emitted by an anchor beacon as one of the signals used to create a signal profile to determine a location of a mobile device. An asset-tracking system using both BLE-emitting asset tracking devices and BLE-emitting anchor beacons may be configured to differentiate between asset tracking devices and anchor beacons by maintaining separate whitelists of device IDs (e.g., UUIDs) that allow for the system to treat anchor beacon signals in one way and asset-tracking signals in another. In some embodiments, anchor beacons may have significantly longer battery life (e.g., up to several years in length) as compared to BLE-emitting devices for tracking assets.

In some embodiments, systems for location determination and asset tracking, such as those described herein, may be configured such that one or more devices in the system may selectively operate in different modes. For example, a device may be configured such that it can operate selectively in one of: (a) a "sensor mode," in which the device collects BLE signals from BLE-emitting assets and transmits information about said collected BLE signals to one or more processors (optionally via one or more base stations); or (b) a "BLE-tag mode" in which the device emits BLE signals for the purpose of allowing the device to be tracked in the manner a BLE-emitting asset is tracked as described herein, but does not collect other devices' BLE signals or upload signal data to the central system.

By being able to switch from sensor mode to BLE-tag mode, devices may be able to cooperate with one another to extend the amount of time over which battery power for a group of devices is preserved. For example, in a scenario in which a group of five devices are determined to be in physical proximity to one another, four of the five devices may switch from sensor mode into BLE-tag mode, such that four of the five devices emit BLE signals that are detected by the fifth device, while only the fifth device uploads BLE signal information to the central system. While the fifth device is operating in sensor mode, the fifth device may intermittently send signals to the other four devices to confirm that it is still present and still operating in sensor mode, such that the system can determine that the other devices may continue to operate in BLE-tag mode. Because sensor mode may be more battery-intensive than BLE-tag mode, battery life may thus be preserved in four of the five devices. The devices may be configured to take turns operating in sensor mode, such that battery life for all five devices is extended maximally.

In some embodiments, the system may be configured such that devices enter into BLE-tag mode for purposes of preserving battery life if one or more predefined trigger conditions are met. Trigger conditions may include one or more of the following:

a condition that a plurality of sensor devices are within a predefined proximity of one another;

a condition that at least one of the devices is capable of operating selectively in BLE-tag mode;

a condition that the plurality of devices have remained proximate to one another for a predefined minimum amount of time;

one or more of the devices has sufficiently higher longer battery time remaining than one or more of the other devices; and/or one or more of the devices has line power (in addition to or rather than battery power).

The system may be configured such that a device in a group of devices having the longest remaining battery life, or having access to line power, may be selected to remain in sensor mode while the other devices switch to BLE-tag mode.

The system may be configured such that, when one or more nearby devices is operating in BLE-tag mode, the one or more nearby devices that remain operating in sensor mode may collect and/or transmit BLE signals from the other devices at a higher frequency than they would if no nearby devices were in BLE-tag mode.

Conditions for exiting BLE-tag mode and re-entering sensor mode may include loss of communication from a nearby device operating in sensor mode, movement of one or more devices in a cooperating group, and/or low battery life of a nearby device operating in sensor mode.

In some embodiments, trigger conditions for entering or exiting BLE-tag mode may be assessed, and determinations as to whether to enter or exit BLE-tag mode may be made, based on processing performed locally at one or more devices configured to selectively operate in the two modes. In some embodiments, assessment of conditions and determination as to whether to switch between modes may be made remotely from the one or more devices, such as by being made at the central system. In the case of remote determination for triggering switching modes, a control signal may be sent from the central system to one or more devices, instructing the one or more devices to switch modes. The control signal may be transmitted via a downlink transmission protocol, for example by being transmitted through one or more base stations (e.g., LPWAN base stations) of the system. The control signals sent to the devices, e.g., via a base station to one of the devices, may be sent via a lower bandwidth protocol than the corresponding uplink protocol.

Figure 5:
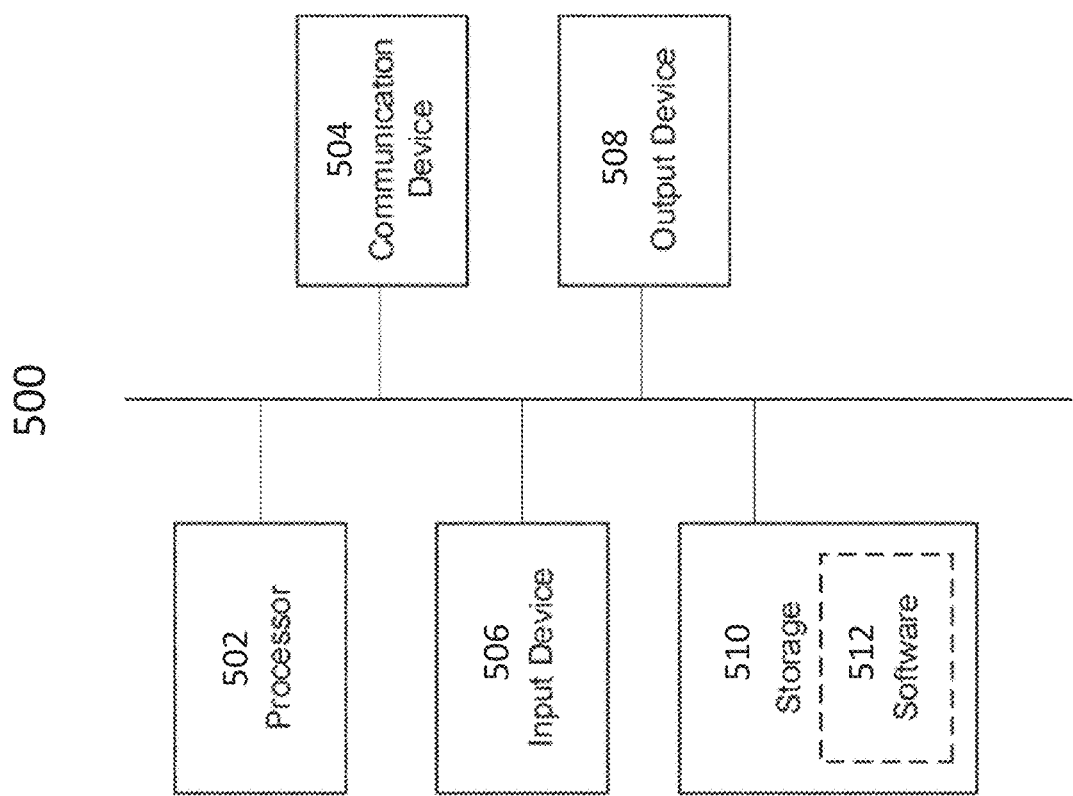
FIG. 5 shows a computer, according to some embodiments.

FIG. 5 illustrates a computer, in accordance with some embodiments. Computer 500 can be a component of a location-determination system and/or a wireless communication system, such as system 100 and/or any of its sub-components, method 200, method 300, and/or device 400. In some embodiments, computer 500 is configured to execute a method for location-determination and/or a method of wireless communication, such as all or part of one or more of methods 200 and/or 300 of FIGS. 2 and 3, respectively. In some embodiments, computer 500 may be configured to serve as a device for displaying and/or controlling a user interface for a location-determination system, such as device 114 in FIG. 1. In some embodiments, computer 500 may be configured display and/or control a user interface for a location-determination system. In some instances computer 500 may include or communicate with a SMS server that may send an alert to a mobile phone.

Computer 500 can be a host computer connected to a network. Computer 500 can be a client computer or a server. As shown in FIG. 5, computer 500 can be any suitable type of microprocessor-based device, such as a personal computer; workstation; server; or handheld computing device, such as a phone or tablet. The computer can include, for example, one or more of processor 502, input device 506, output device 508, storage 510, and communication device 504.

Input device 506 can be any suitable device that provides input, such as a touch screen or monitor, keyboard, mouse, or voice-recognition device. Output device 508 can be any suitable device that provides output, such as a touch screen, monitor, printer, disk drive, or speaker.

Storage 510 can be any suitable device that provides storage, such as an electrical, magnetic, or optical memory, including a RAM, cache, hard drive, CD-ROM drive, tape drive, or removable storage disk. Communication device 504 can include any suitable device capable of transmitting and receiving signals over a network, such as a network interface chip or card. The components of the computer can be connected in any suitable manner, such as via a physical bus or wirelessly. Storage 510 can be a non-transitory computer-readable storage medium comprising one or more programs, which, when executed by one or more processors, such as processor 502, cause the one or more processors to execute methods described herein, such as all or part of one or more of methods 200 or 300 described with respect to FIGS. 2 and 3, respectively.

Software 512, which can be stored in storage 510 and executed by processor 502, can include, for example, the programming that embodies the functionality of the present disclosure (e.g., as embodied in the systems, computers, servers, and/or devices as described above). In some embodiments, software 512 can be implemented and executed on a combination of servers such as application servers and database servers.

Software 512 can also be stored and/or transported within any computer-readable storage medium for use by or in connection with an instruction execution system, apparatus, or device, such as those described above, that can fetch and execute instructions associated with the software from the instruction execution system, apparatus, or device. In the context of this disclosure, a computer-readable storage medium can be any medium, such as storage 510, that can contain or store programming for use by or in connection with an instruction execution system, apparatus, or device.

Software 512 can also be propagated within any transport medium for use by or in connection with an instruction execution system, apparatus, or device, such as those described above, that can fetch and execute instructions associated with the software from the instruction execution system, apparatus, or device. In the context of this disclosure, a transport medium can be any medium that can communicate, propagate, or transport programming for use by or in connection with an instruction execution system, apparatus, or device. The transport-readable medium can include, but is not limited to, an electronic, magnetic, optical, electromagnetic, or infrared wired or wireless propagation medium.

Computer 500 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Computer 500 can implement any operating system suitable for operating on the network. Software 512 can be written in any suitable programming language, such as C, C++, Java, or Python. In various embodiments, application software embodying the functionality of the present disclosure can be deployed in different configurations, such as in a client/server arrangement or through a Web browser as a Web-based application or Web service, for example.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. Finally, the entire disclosure of the patents and publications referred to in this application are hereby incorporated herein by reference.

Any of the systems, methods, techniques, and/or features disclosed herein may be combined, in whole or in part, with any other systems, methods, techniques, and/or features disclosed herein.

The invention claimed is:

1. An asset tracking system for determining a location of an asset, the system comprising:
    a mobile device comprising one or more detection antennas configured to detect electromagnetic signals in an environment and a transmitter configured to transmit signals; and
    a plurality of devices emitting Bluetooth low energy signals, wherein a device emitting Bluetooth low energy signals of the plurality of devices is associated with an asset within the environment;
    wherein the system is configured to:
        detect, by the mobile device, a plurality of Bluetooth low energy signals emitted by the plurality of devices;
        detect, at the one or more detection antennas of the mobile device, a plurality of electromagnetic signals of the environment;
        select, by the mobile device, a subset of the plurality of Bluetooth low energy signals, wherein one or more Bluetooth low energy signals from the device emitting Bluetooth low energy signals are part of the selected subset;

generate, at the mobile device, a signal profile based on the plurality of electromagnetic signals;

determine, based on a comparison of the signal profile to data of signal profiles at a plurality of locations in the environment, a mobile-device location in the environment; and determine, by one or more processors, based on the mobile-device location and based on the one or more Bluetooth low energy signals, an asset location in the environment.

2. The asset tracking system of claim 1, wherein the system is configured to transmit, at the transmitter of the mobile device, the signal profile to the one or more processors.

3. The asset tracking system of claim 2, wherein transmitting the signal profile to the one or more processors comprises transmitting the signal profile to one or more base stations.

4. The asset tracking system of claim 3, wherein transmitting the signal profile to the one or more processors comprises transmitting the signal profile from the one or more base stations to a server.

5. The asset tracking system of claim 1, wherein the signal profile comprises information about a subset of the plurality of electromagnetic signals.

6. The asset tracking system of claim 1, wherein the plurality of electromagnetic signals of the environment comprises signals emitted by one or more of: Wi-Fi access points, Bluetooth devices, network-enabled appliances, network-enabled infrastructure devices, and IoT devices.

7. The asset tracking system of claim 1, wherein generating the signal profile based on the plurality of electromagnetic signals comprises comparing the plurality of electromagnetic signals to a predefined list of electromagnetic signals to select a subset of the plurality of electromagnetic signals based on the predefined list.

8. The asset tracking system of claim 1, wherein the data of signal profiles at a plurality of locations in the environment comprises data captured by a detection device prior to the detection of the plurality of electromagnetic signals by the mobile device.

9. The asset tracking system of claim 1, wherein the mobile device is configured to detect an input comprising an instruction to determine the location of the mobile device, and the detection of the plurality of electromagnetic signals in the environment is performed in response to detecting the input.

10. The asset tracking system of claim 1, wherein the system is further configured to generate and display an alert regarding the determined location of the mobile device.

11. The asset tracking system of claim 1, wherein the environment comprises a hospital, a hotel, a residential building, a commercial building, a senior living facility, or a school.

12. The asset tracking system of claim 1, wherein the asset includes medical equipment or medical supplies.

13. The asset tracking system of claim 1, wherein a Bluetooth low energy signal emitted by a Bluetooth low energy device of the one or more devices emitting Bluetooth low energy signals includes battery life information of the Bluetooth low energy device.

14. The asset tracking system of claim 1, wherein each Bluetooth low energy signal of the one or more Bluetooth low energy signals comprises identification information identifying at least one of a first Bluetooth low energy device or a first asset.

15. The asset tracking system of claim 1, wherein the plurality of devices emitting Bluetooth low energy signals comprises a Bluetooth low energy tag.

16. The asset tracking system of claim 1, wherein the plurality of devices emitting Bluetooth low energy signals comprises a device configured to emulate a Bluetooth low energy tag.

17. The asset tracking system of claim 1, wherein the system is configured to transmit, at the transmitter of the mobile device, data regarding the one or more Bluetooth low energy signals to the one or more processors.

18. The asset tracking system of claim 17, wherein the data regarding the one or more Bluetooth low energy signals, transmitted to the one or more processors, comprises identification information identifying the device emitting Bluetooth low energy signals.

19. The asset tracking system of claim 17, wherein the data regarding the one or more Bluetooth low energy signals, transmitted to the one or more processors, comprises signal strength information indicating a signal strength associated with the one or more Bluetooth low energy signals emitted by the device emitting Bluetooth low energy signals and detected by the mobile device.

20. The asset tracking system of claim 17, wherein the data regarding the one or more Bluetooth low energy signals, transmitted to the one or more processors, comprises battery information associated with the device emitting Bluetooth low energy signals.

21. The asset tracking system of claim 17, wherein transmitting the data regarding the one or more Bluetooth low energy signals to the one or more processors comprises transmitting the data regarding the one or more Bluetooth low energy signals to one or more base stations.

22. The asset tracking system of claim 21, wherein transmitting the data regarding the one or more Bluetooth low energy signals to the one or more processors comprises transmitting the data regarding the one or more Bluetooth low energy signals from the one or more base stations to a server.

23. The asset tracking system of claim 17, wherein transmitting the data regarding the one or more Bluetooth low energy signals comprises transmitting identity information identifying the device emitting Bluetooth low energy signals and transmitting signal strength information regarding the one or more Bluetooth low energy signals.

24. The asset tracking system of claim 17, wherein transmitting the data regarding the one or more Bluetooth low energy signals comprises transmitting identity information identifying the device emitting Bluetooth low energy signals and transmitting device status information regarding the device emitting Bluetooth low energy signals.

25. The asset tracking system of claim 1, wherein selecting the subset of the plurality of Bluetooth low energy signals comprises selecting signals based on device identity information included in the selected signals.

26. The asset tracking system of claim 1, wherein selecting the subset of the plurality of Bluetooth low energy signals comprises selecting signals based on signal strength of the selected signals.

27. The asset tracking system of claim 1, wherein selecting the subset of the plurality of Bluetooth low energy signals comprises iteratively updating the subset to include the signals having the highest signal-strength detected over a period of time.

28. The asset tracking system of claim 1, wherein the plurality of devices emitting Bluetooth low energy signals comprises a device configured to selectively operate in a first mode or a second mode, wherein:
  when in the first mode, the device is configured to collect other Bluetooth low energy signals emitted by other devices in the system and to transmit data regarding the other Bluetooth low energy signals collected; and
  when in the second mode, the device is configured to emit Bluetooth low energy but to not collect other Bluetooth low energy signals nor transmit data regarding other Bluetooth low energy signals.

29. The asset tracking system of claim 1, wherein the device configured to selectively operate in a first mode or a second mode is configured to switch from the first mode to the second mode in accordance with a determination that a set of trigger conditions is met.

30. The asset tracking system of claim 1, wherein the device configured to selectively operate in a first mode or a second mode is configured to switch from the first mode to the second mode in accordance with receipt of a control signal.

31. An asset tracking method for determining a location of an asset, the method performed by a system comprising:
  a mobile device comprising one or more detection antennas configured to detect electromagnetic signals in an environment and a transmitter configured to transmit signals; and
  a plurality of devices emitting Bluetooth low energy signals, wherein a device emitting Bluetooth low energy signals of the plurality of devices is associated with an asset within the environment;
  wherein the method comprises:
    detecting, by the mobile device, a plurality of Bluetooth low energy signals emitted by the plurality of devices;
    detecting, at the one or more detection antennas of the mobile device, a plurality of electromagnetic signals of the environment;
    selecting, by the mobile device, a subset of the plurality of Bluetooth low energy signals, wherein one or more Bluetooth low energy signals from the device emitting Bluetooth low energy signals are part of the selected subset;
    generating, at the mobile device, a signal profile based on the plurality of electromagnetic signals;
    determining, based on a comparison of the signal profile to data of signal profiles at a plurality of locations in the environment, a mobile-device location in the environment; and
    determining, by one or more processors, based the mobile-device location and based on the one or more Bluetooth low energy signals, an asset location in the environment.

32. A non-transitory computer-readable storage medium for determining a location of an asset, the storage medium storing instructions configured to be executed by a system comprising:
  a mobile device comprising one or more detection antennas configured to detect electromagnetic signals in an environment and a transmitter configured to transmit signals; and
  a plurality of devices emitting Bluetooth low energy signals, wherein a device emitting Bluetooth low energy signals of the plurality of devices is associated with an asset within the environment;
  wherein the instructions are configured to cause the system to:
    detect, by the mobile device, a plurality of Bluetooth low energy signals emitted by the plurality of devices;
    detect, at the one or more detection antennas of the mobile device, a plurality of electromagnetic signals of the environment;
    select, by the mobile device, a subset of the plurality of Bluetooth low energy signals, wherein one or more Bluetooth low energy signals from the device emitting Bluetooth low energy signals are part of the selected subset;
    generate, at the mobile device, a signal profile based on the plurality of electromagnetic signals;
    determine, based on a comparison of the signal profile to data of signal profiles at a plurality of locations in the environment, a mobile-device location in the environment; and
    determine, by one or more processors, based the mobile-device location and based on the one or more Bluetooth low energy signals, an asset locations in the environment.

\* \* \* \* \*